United States Patent [19]

Mandai et al.

[11] 4,219,691

[45] Aug. 26, 1980

[54] PROCESS FOR PRODUCING OLEFIN OLIGOMER

[75] Inventors: Hiroshi Mandai, Chiba; Anri Tominaga, Tokyo; Yoshikazu Yoshimura, Ichikawa; Hiroshi Isa, Yachiyo, all of Japan

[73] Assignee: The Lion Fat and Oil Co., Ltd., Tokyo, Japan

[21] Appl. No.: 936,043

[22] Filed: Aug. 23, 1978

[30] Foreign Application Priority Data

Aug. 31, 1977 [JP] Japan .................................. 52/104413

[51] Int. Cl.$^2$ ................................................. C07C 3/18
[52] U.S. Cl. .................................. 585/532; 252/429 R
[58] Field of Search ................ 260/683.15 B; 585/532

[56] References Cited

U.S. PATENT DOCUMENTS

| 2,084,082 | 6/1937 | Fitch ........................... 260/683.15 B |
| 2,440,498 | 4/1948 | Young et al. ................ 260/683.15 B |
| 2,631,176 | 3/1953 | Heinrich ...................... 260/683.15 B |
| 3,780,128 | 12/1973 | Shubkin ............................ 260/683.9 |
| 3,833,678 | 9/1974 | Brennan ...................... 260/683.15 B |

*Primary Examiner*—Arthur P. Demers
*Attorney, Agent, or Firm*—Armstrong, Nikaido, Marmelstein & Kubovcik

[57] ABSTRACT

Disclosed is a process for producing olefin oligomer from olefins having not less than 6 carbon atoms in the presence of a reaction mixture of an aluminum halide and a secondary or tertiary alcohol in the stated equivalent proportions. The olefin oligomers thus obtained have a high kinematic viscosity, a low pour point, a high viscosity index and a good shear stability.

4 Claims, No Drawings

PROCESS FOR PRODUCING OLEFIN OLIGOMER

BACKGROUND OF THE INVENTION

(1) Field of the Invention

The present invention relates to a process for preparing olefin oligomers from olefins having not less than 6 carbon atoms. More specifically, it relates to a process for polymerizing olefins having not less than 6 carbon atoms by using a novel modified Lewis acid catalyst to produce liquid polymers or oligomers having a high kinematic viscosity, a low pour point, a high viscosity index and a good shear stability.

(2) Description of the Prior Art

It is well-known in the art that Lewis acid catalysts are useful, as a catalyst, for the production of liquid polymers or oligomers from olefins. In fact, in the case where olefins are polymerized by using, as a catalyst, aluminum chloride, oligomers having a kinematic viscosity of not more than approximately 400 cst at 37.8° C. (100° F.) can be obtained. Japanese Pat. No. 44-3804/1969 describes a process for producing liquid olefin polymers in the presence of, as a catalyst, a solution of 1.1 through 1.7 mol of an aluminum halide in 1 mol of an ester of a fatty acid. However, a kinematic viscosity of the liquid olefin polymers obtained according to this process is less than approximately 500 cst at 37.8° C. (100° F.).

Japanese Laid-Open Application No. 50-111001/1975 which substantially corresponds to U.S. Pat. No. 3,952,071 and DE-OS No. 2,502,708 discloses the use of the reaction mixture of an aluminum halide with a polyhydric alcohol derivative, as a catalyst, for the production of liquid polymer from olefins. However, this process provides an olefin oligomer having a low kinematic viscosity, which is lower than that of an olefin oligomer prepared by using only an aluminum halide catalyst.

Japanese Laid-Open Application No. 51-124186/1976 (which substantially corresponds to U.S. Pat. No. 4,006,199 and DE-OS No. 2,617,403) discloses the use of the reaction mixture of an aluminum halide with a dicarbonyl compound, as a catalyst, for the production of an olefin oligomer. However, although this process provides an olefin oligomer having a high kinematic viscosity, there is a problem in this process that the kinematic viscosity of the oligomer is greatly changed by a slight change of the reaction ratio (or equivalent weight ratio) of the aluminum halide with the dicarbonyl compound.

The objects of the present invention are to provide a process for producing an olefin oligomer having a high kinematic viscosity, a low pour point, a high viscosity index and a good shear stability, and also, to provide a catalyst suitable for use in producing the above-mentioned oligomer from olefins having not less than 6 carbon atoms. Other objects and advantages of the present invention will become clear from the following description.

In accordance with the present invention, there is provided a process for producing an olefin oligomer comprising polymerizing at least one olefin having not less than 6 carbon atoms in the presence of a catalyst consisting essentially of a reaction mixture of an aluminum halide with a secondary or tertially alcohol, in an amount of 0.05 through 0.95 chemical equivalent of said alcohol based on 1.0 chemical equivalent of said aluminum halide.

In accordance with the present invention, there is also provided a catalyst for oligomerization of olefins having not less than 6 carbon atoms prepared by mixing an aluminum halide and a secondary or tertially alcohol, in an amount of 0.05 through 0.95 chemical equivalent of said alcohol based on 1.0 chemical equivalent of said aluminum halide at a temperature of within the range of from 10° to 150° C.

The catalysts used in the present invention can be easily prepared by mixing an aluminum halide and a secondary or tertiary alcohol generally at a temperature of from 10° to 150° C., and more preferably from 20° to 100° C. However, it should be noted that the mixing temperature of the aluminum halide and the alcohol does not have any effect on the properties of the formed catalyst. The amount of the secondary or tertiary alcohol is generally 0.05 through 0.95 chemical equivalent, and more preferably, 0.1 through 0.9 chemical equivalent, based on 1.0 chemical equivalent of the aluminum halide. When the amount of the alcohol component is less than 0.05 chemical equivalent based on 1.0 chemical equivalent of the aluminum halide, liquid polymers having a high kinematic viscosity can not be obtained. The inventors believe that this is because the aluminum halide acts, as a Lewis acid, on the oligomerization reaction. Contrary to this, when the amount of the alcohol component is more than 0.95 chemical equivalent based on 1.0 chemical equivalent of the aluminum halide, the oligomerization reaction does not proceed smoothly, so that the yield of the oligomer remarkably decreases. The inventors have found that, even if the reaction ratio of the aluminum halide and the secondary or tertiary alcohol is changed within the above-mentioned range, the kinematic viscosity of the oligomers so obtained is not greatly changed.

The aluminum halides used in the present invention include aluminum fluoride, aluminum chloride, aluminum bromide, aluminum iodide and mixtures thereof. Preferable aluminum halide is aluminum chloride.

The secondary or tertiary alcohol used in the present invention is an important component which modifies the catalytic activity of the aluminum halide as a Lewis acid and is selected from aliphatic and alicyclic alcohols having 3 to 10 carbon atoms, and more preferably 3 to 8 carbon atoms. Examples of such secondary or tertiary alcohols are isopropyl alcohol, tert.-butyl alcohol, sec-butyl alcohol, pentane-2-ol, hexane-2-ol, cyclohexanol, 2-methyl-cyclopentanol, hexane-3-ol, heptane-2-ol, octane-2-ol, hexane-2,3-diol, hexane-2,3,4-triol and the like; and any mixtures thereof.

Olefins used in the present invention include aliphatic monoolefins having not less than 6 carbon atoms, preferably 6 through 20 carbon atoms. Examples of such olefins are hexene-1, octene-1,2-ethyloctene-1, tridecene-3, pentadecene-2, octadecene-1, eicosene-2 and the like. The position of the double bond in olefins is not specifically limited in the present invention.

The amount of the catalyst of the present invention is preferably adjusted according to the amount of the starting olefin or olefins to be used in an oligomerization reaction. Accordingly, in the practice of the present oligomerization reaction, the aluminum halide is used in an amount of, generally 0.5 through 14 mol%, and more preferably 2 through 10 mol%, based on the starting olefin or olefins. If the amount of the aluminum halide is less than 0.5 mol%, the oligomerization reaction rate unpreferably decreases. On the other hand, if the amount of the aluminum halide is more than 14 mol%, the kinematic viscosity of the product and the reaction rate do not increase any more and the post-treatment of the catalyst after the completion of the oligomerization reaction becomes troublesome. The secondary or tertiary alcohol is mixed with the aluminum halide in the predetermined chemical equivalent ratio within the above-mentioned range.

The polymerization or oligomerization reaction according to the present invention is, in general, carried out in, for example an autoclave under pressure. The reaction temperature is generally within the range of from −20° to 100° C, preferably from 0° to 60° C., although it depends on the kind of the alcohol to be used, the equivalent ratio of the alcohol to the aluminum halide and the desired properties of the oligomers to be prepared. The reaction can be carried out in the presence of or in the absence of solvent. Especially, in the case where the agitation cannot be sufficiently effected due to the high kinematic viscosity, the solvent may be advantageously used in the oligomerization reaction of the present invention for the purposes of the relaxation of the viscosity increase and easy control of the reaction temperature. Examples of the suitable solvents are hydrocarbons such as n-pentane, isooctane, cyclohexane, decane, benzene, xylene and the like, and; halogenated hydrocarbons such as trichloroethane, 1,2-dichloroethane, tetrafluoroethane and the like. The suitable amount of the solvent is within the range of from 20 to 200% by volume, based on the volume of the starting olefin or olefins.

One of the advantages of the process of the present invention resides in the fact that the kinematic viscosity of the oligomer obtained according to the present invention is not greatly changed unless the kinds of the aluminum halide and the secondary or tertiary alcohol are changed. In known processes for producing oligomers having a high viscosity by using, as a catalyst, a reaction mixture of an aluminum halide and a dicarbonyl compound, only a slight change in the ratio of the amount of the dicarbonyl compound to the aluminum halide causes a large change in the kinematic viscosity of the oligomer so obtained. For this reason, in order to obtain an oligomer having an approximately constant kinematic viscosity in each batch, in the known processes the respective amounts of the aluminum halide and the dicarbonyl compound must be strictly controlled in each batch to keep an approximately constant ratio of the amounts of the aluminum halide and the dicarbonyl compound. Contrary to this, the catalysts according to the present invention consisting essentially of the aluminum halide and the secondary or tertiary alcohol (an equivalent weight ratio of the former to the latter is 1:0.05–0.95) provide oligomers, the kinematic viscosity of which is not greatly changed unless the kinds of the aluminum halide and the secondary or tertiary alcohol are changed. Therefore, according to the present invention, there is an advantage that the catalyst can be prepared without the necessity of the strict control of the mixing ratio of the components compared to the known catalyst, in order to obtain an oligomer having an approximately constant kinematic viscosity in each batch.

According to the present invention, as will be clear from Examples shown hereinbelow, Oligomers having, in addition to a high kinematic viscosity, a low pour point, a high viscosity index and a good shear stability can be produced.

The oligomers per se obtained by the present invention can be used as, for example, a lubricant oil. The oligomers obtained according to the present invention can be hydrogenated by using a known hydrogenation catalyst, such as Raney nickel, diatomaceous earth-nickel or the like, in order to improve oxidation stability and heat stability.

The oligomers can be widely used as, for example, a gear oil, a grease base, a refrigerator oil, an engine oil additive, a metal working oil and a spinning oil for a tire cord, as well as a cosmetic base and a medical base.

The present invention will be further illustrated by, but is by no means limited to, the following Examples. In the following Examples, the kinematic viscosity was determined in the manner described in JIS (Japanese Industrial Standards)-K2283 (ASTM-D-445), the viscosity index was determined in the manner described in JIS-K2284 (ASTM-D-2270) and the pour point was determined in the manner described in JIS-K2269 (ASTM-D-97). The shear stability was determined as the percent of decrease of the kinematic viscosity at 37.8° C. when 30 g of a sample oligomer were irradiated for 40 minutes with ultrasonic wave having a frequency of 10 kc/s and an amplitude of 31 micron.

EXAMPLE 1

Into a 1 l glass autoclave provided with an agitator, 0.142 equivalent weight (19.0 g) of aluminum chloride ($AlCl_3$) and 0.10 equivalent weight of the kind of alcohol listed in Table 1 below were charged and mixed together. The equivalent ratio of the alcohol to the aluminum chloride was 0.7. 600 g (3.57 mole) of dodecene-1 were dropwise added to the mixture and oligomerized for 3 hours, while the temperature of the mixture was maintained at 25° C. After the completion of the oligomerization, ammonia gas was blown into the oligomerization mixture to deactivate the catalyst and the deactivated catalyst was filtered off. The filtrate was subjected to a topping operation so as to remove the unreacted olefin. Thus, a product oligomer was obtained.

The yield of the oligomer and properties thereof are shown in Table 1 below.

Table 1

| Run No. | Alcohol | Yield (%) | Property of Oligomer | | | |
|---|---|---|---|---|---|---|
| | | | Kinematic Viscosity at 37.8° C. (cst)** | Viscosity Index | Pour Point (°C.) | Shear Stability (%) |
| 1* | Ethyl Alcohol | 96 | 432 | 161 | −37.5 | 0.2 |
| 2 | Isopropyl Alcohol | 98 | 964 | 175 | −30 | 0.2 |
| 3* | n-Butyl Alcohol | 97 | 417 | 160 | −37.5 | 0.2 |
| 4 | t-Butyl Alcohol | 98 | 1470 | 183 | −30 | 0.3 |
| 5 | Cyclohexanol | 95 | 1076 | 183 | −30 | 0.3 |
| 6 | Octane-2-Ol | 97 | 1023 | 176 | −30 | 0.2 |
| 7 | Decane-1-Ol | 97 | 490 | 162 | −35 | 0.2 |

Table 1-continued

| Run No. | Alcohol | Yield (%) | Kinematic Viscosity at 37.8° C. (cst)** | Viscosity Index | Pour Point (°C.) | Shear Stability (%) |
|---|---|---|---|---|---|---|
| 8* | Dodecane-2-Ol | 96 | 383 | 157 | −37.5 | 0.2 |

*Run Nos. 1, 3 and 8 are comparative examples.
**1 cst = 0.01 cm²/sec.

EXAMPLE 2

Into a 1 l glass autoclave provided with an agitator, 0.142 equivalent weight (19.0 g) of aluminum chloride and t-butyl alcohol in an amount listed in Table 2 below were charged and mixed together. While the temperature of the mixture was maintained at 25° C., 600 g (3.57 mole) of dodecene-1 was gradually added dropwise to the mixture and oligomerized for 3 hours. After the completion of the oligomerization, ammonia gas was blown into the oligomerization mixture to deactivate the catalyst and the deactivated catalyst was filtered off. The filtrate was subjected to a topping operation so as to remove the unreacted olefin. Thus, a product oligomer was obtained.

The yield of the oligomer and properties thereof are shown in Table 2 below.

Table 2

| Run No. | Equivalent Weight Ratio Alcohol AlCl₃ | Yield (%) | Kinematic Viscosity at 37.8° C. (cst)*** | Viscosity Index | Pour Point (°C.) | Shear Stablity (%) |
|---|---|---|---|---|---|---|
| 9* | 0.045 | 94 | 425 | 160 | −37.5 | 0.2 |
| 10 | 0.05 | 99 | 850 | 172 | −30 | 0.2 |
| 11 | 0.1 | 99 | 1100 | 178 | −30 | 0.3 |
| 12 | 0.3 | 98 | 1180 | 179 | −30 | 0.2 |
| 13 | 0.5 | 98 | 1230 | 180 | −30 | 0.3 |
| 4** | 0.7 | 98 | 1470 | 183 | −30 | 0.3 |
| 14 | 0.9 | 98 | 1090 | 178 | −30 | 0.2 |
| 15 | 1.0 | 74 | 591 | 168 | −35 | 0.2 |
| 16* | 1.25 | 13 | 210 | 140 | −40 | 0.2 |

*Run Nos. 9 and 16 are comparative examples.
**Please refer to Example 1.
*** 1 cst = 0.01 cm²/sec.

EXAMPLE 3

The oligomerization reaction of Run No. 13 of Example 2 was repeated as Run No. 17, except that the reaction temperature was 60° C. The results were as follows.

| | |
|---|---|
| Yield | 99% |
| Kinematic Viscosity at 37.8° C. | 1020 cst (=10.2 cm²/sec) |
| Viscosity Index | 176 |
| Pour Point | −30° C. |
| Shear Stability | 0.3% |

EXAMPLE 4

The oligomerization reaction of Run No. 4 of Example 1 was repeated as Run No. 18, except that hexene-1 was used in lieu of dodecene-1. The results were as follows.

| | |
|---|---|
| Yield | 99% |
| Kinematic Viscosity at 37.8° C. | 3004 cst (=30.04 cm²/sec) |
| Viscosity Index | 132 |
| Pour Point | −25° C. |
| Shear Stability | 0.3 |

EXAMPLE 5

The oligomerization reaction of Run No. 4 of Example 1 was repeated as Run No. 19, except that tetradecene-1 was used in lieu of dodecene-1. The results were as follows.

| | |
|---|---|
| Yield | 99% |
| Kinematic Viscosity at 37.8° C. | 1080 cst (=10.8 cm²/sec) |
| Viscosity Index | 177 |
| Pour Point | −30° C. |
| Shear Stability | 0.3% |

EXAMPLE 6

Each oligomer obtained in Run Nos. 1 through 19 was hydrogenated in the presence of 3% by weight of Raney Ni under a hydrogen pressure of 10 kg/cm², for 3 hours, at a temperature of 150° C. The properties of the hydrogenated oils are shown in Table 3 below.

Table 3

| Run No. | Kinematic Viscosity at 37.8° C. (cst)** | Viscosity Index | Pour Point (°C.) | Shear Stability (%) |
|---|---|---|---|---|
| 1 | 433 | 161 | −37.5 | 0.2 |
| 2 | 965 | 176 | −30 | 0.2 |
| 3 | 419 | 160 | −37.5 | 0.2 |
| 4 | 1470 | 183 | −30 | 0.3 |
| 5 | 1077 | 177 | −30 | 0.3 |
| 6 | 1024 | 176 | −30 | 0.2 |
| 7 | 492 | 162 | −35 | 0.2 |
| 8 | 384 | 157 | −37.5 | 0.2 |
| 9 | 426 | 160 | −37.5 | 0.2 |

Table 3-continued

| Run No. | Kinematic Viscosity at 37.8° C. (cst)** | Viscosity Index | Pour Point (°C.) | Shear Stability (%) |
|---|---|---|---|---|
| 10 | 851 | 173 | −30 | 0.2 |
| 11 | 1101 | 178 | −30 | 0.3 |
| 12 | 1181 | 179 | −30 | 0.2 |
| 13 | 1230 | 180 | −30 | 0.3 |
| 14 | 1091 | 178 | −30 | 0.2 |
| 15 | 592 | 167 | −35 | 0.2 |
| 16 | 218 | 140 | −40 | 0.2 |
| 17 | 1021 | 176 | −30 | 0.3 |
| 18 | 3004 | 132 | −25 | 0.3 |
| 19 | 1082 | 177 | −30 | 0.3 |

*Run Nos. 1, 3, 8, 9 and 16 are comparative examples.
**1 cst=0.01 cm$^2$/sec.

EXAMPLE 7

The oligomerization reaction of Run No. 4 of Example 1 was repeated, except that 0.142 equivalent weight of aluminum bromide (AlBr$_3$) was used in lieu of AlCl$_3$. The results were as follows.

| Yield | 97% |
|---|---|
| Kinematic Viscosity at 37.8° C. | 1013 cst (=10.13 cm$^2$/sec) |
| Viscosity Index | 177 |
| Pour Point | −30 |
| Shear Stability | 0.2% |

What we claim is:

1. A process for producing an olefin oligomer comprising polymerizing one or a mixture of olefins each of which has 6 through 20 carbon atoms in the presence of a catalyst consisting essentially of a reaction mixture of an aluminum halide with a secondary or tertiary alcohol selected from aliphatic and alicyclic alcohols having 3 to 10 carbon atoms, in an amount of 0.05 through 0.95 chemical equivalent of said alcohol, based on 1.0 chemical equivalent of said aluminum halide.

2. A process as claimed in claim 1, wherein said olefin is selected from hexene-1, octene-1, 2-ethyloctene-1, tridecene-3, pentadecene-2, octadecene-1 and eicosene-2.

3. A process as claimed in claim 1, wherein said aluminum halide is aluminum chloride.

4. A process as claimed in claim 1, wherein said polymerization reaction is carried out at a temperature of from −° to 100° C.

* * * * *